Aug. 15, 1967
N. P. GLUTH
3,336,534
MULTI-PHASE DETECTOR AND KEYED-ERROR DETECTOR
PHASE-LOCKED-LOOP
Filed Feb. 8, 1965
5 Sheets-Sheet 1
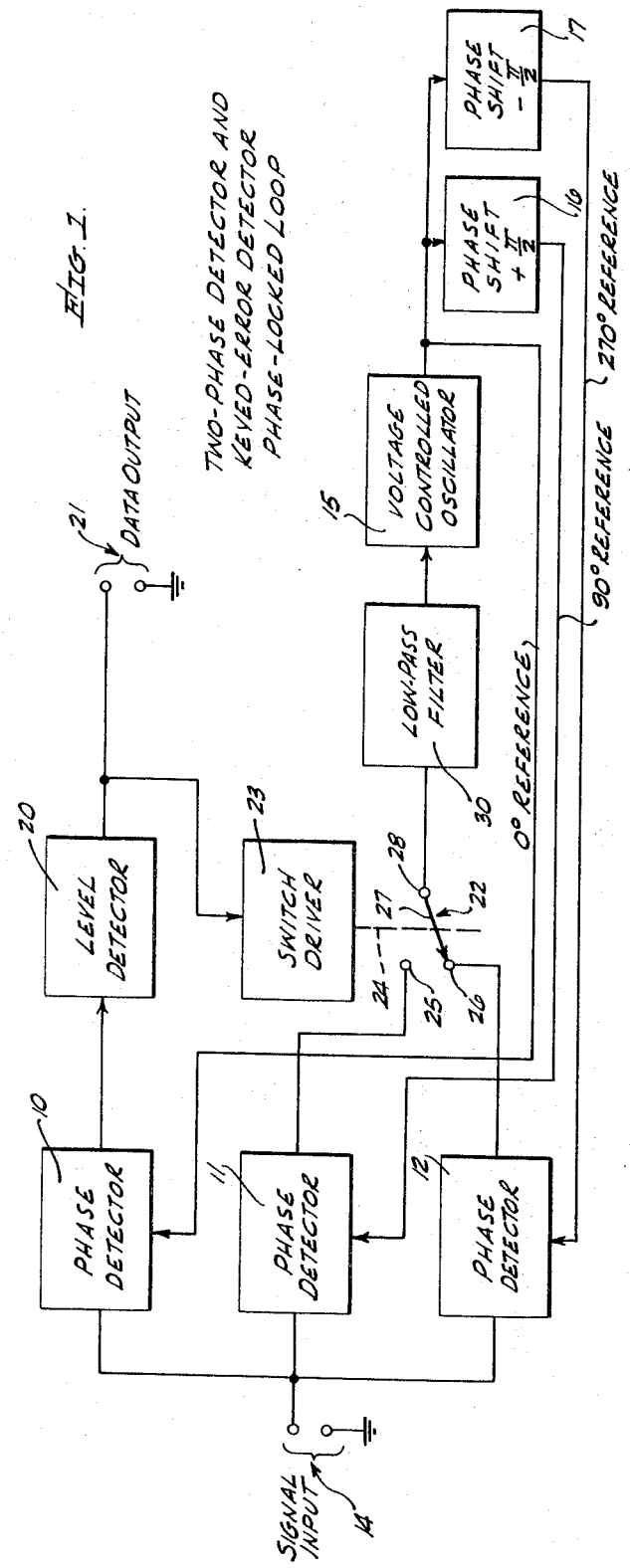
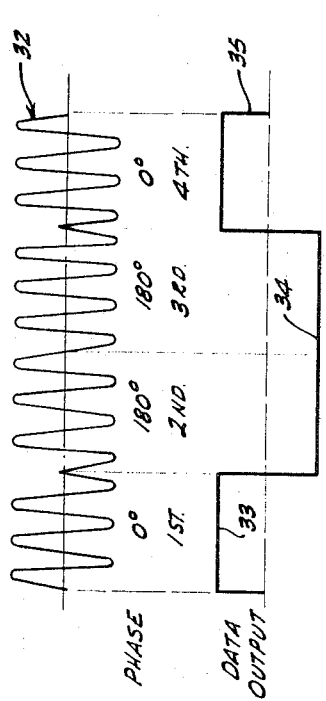
INVENTOR.
NORMAN P. GLUTH,
BY
Robert H. Himes
ATTORNEY

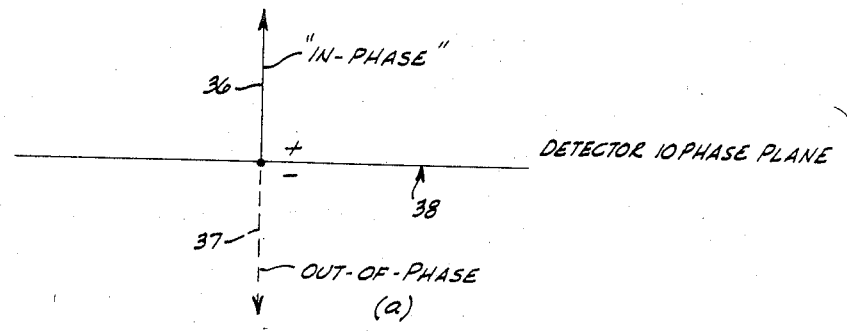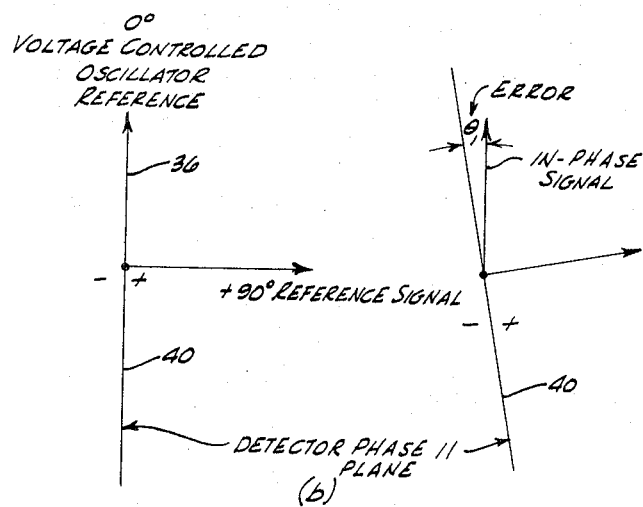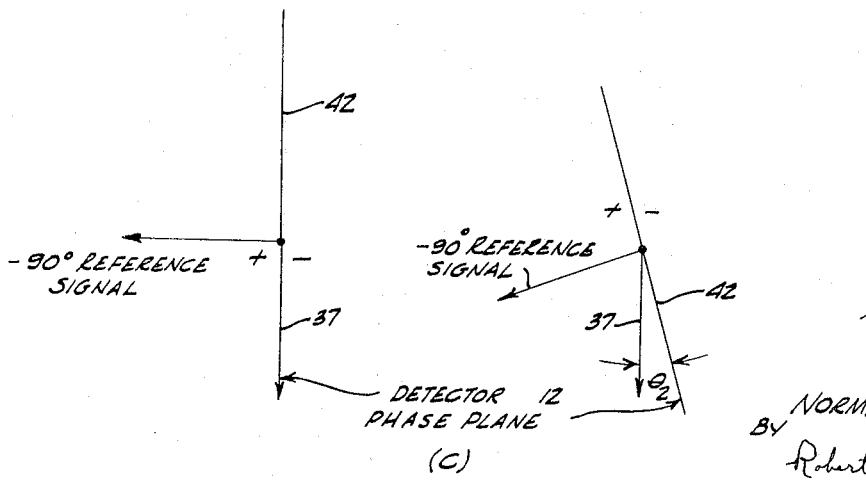
FIG. 3.

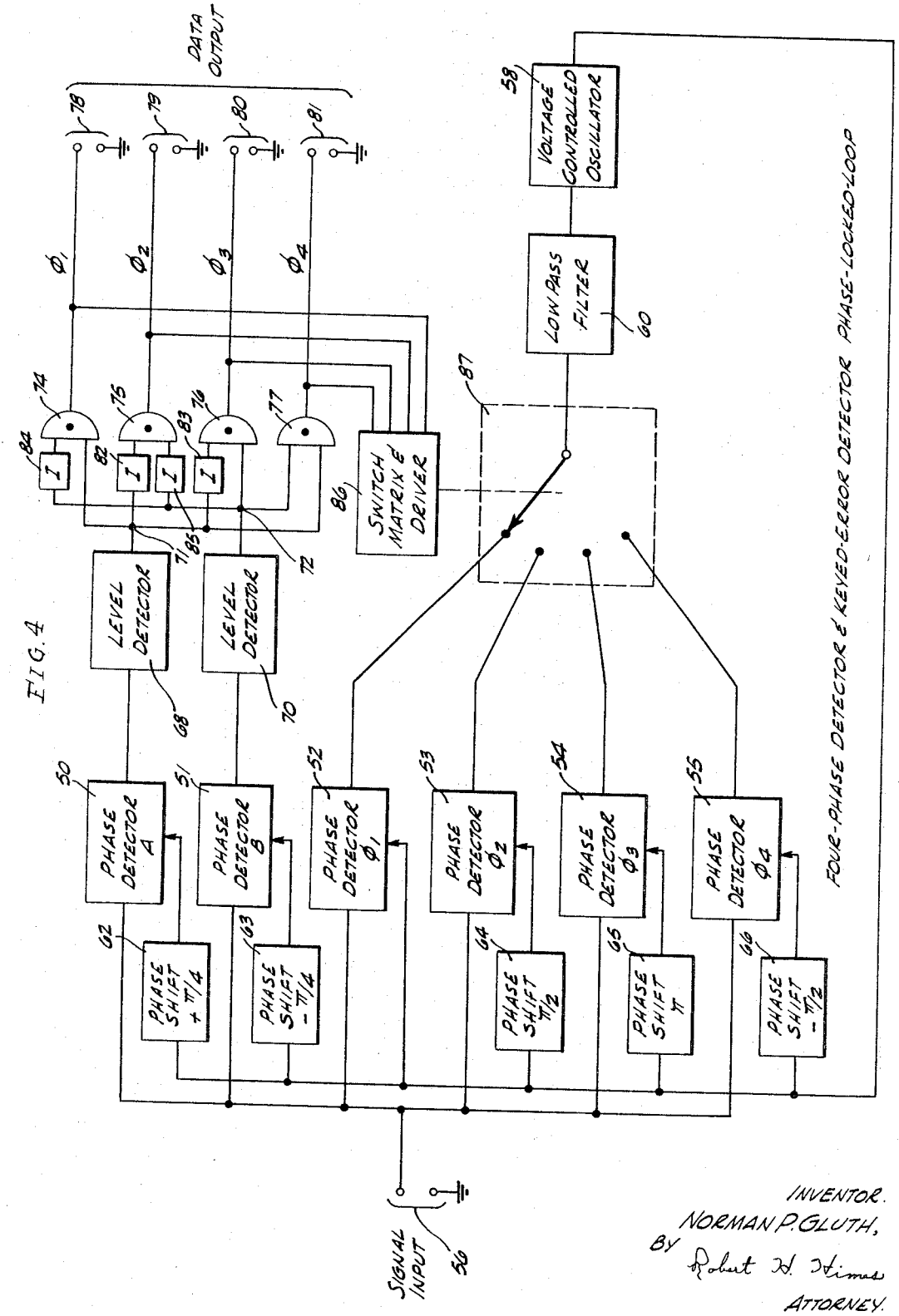

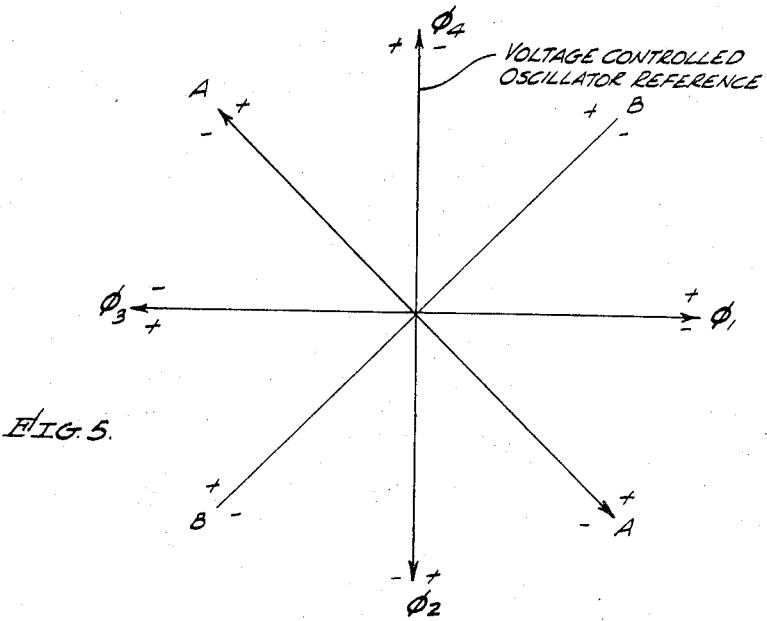

FIG. 5.

|  | A | B | TRUE |
|---|---|---|---|
| $\phi_1$ | + | − | $A \cdot \bar{B}$ |
| $\phi_2$ | − | − | $\bar{A} \cdot \bar{B}$ |
| $\phi_3$ | − | + | $\bar{A} \cdot B$ |
| $\phi_4$ | + | + | $A \cdot B$ |

PHASE-PLANE DIAGRAM & TRUTH TABLE FOR FOUR-PHASE-DETECTOR

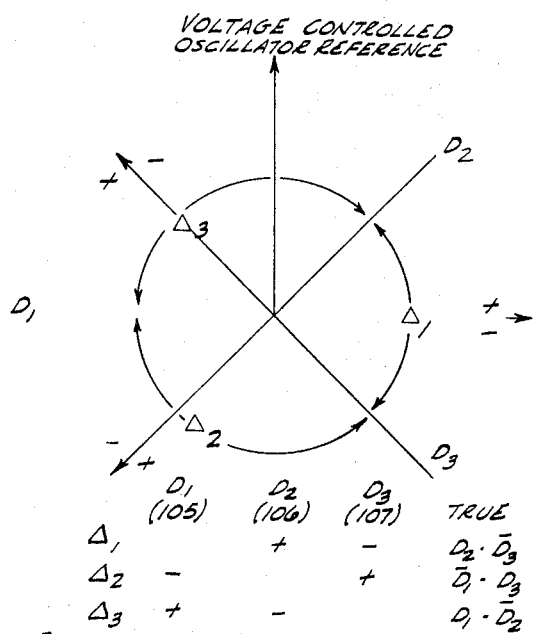

FIG. 7.

|  | $D_1$ (105) | $D_2$ (106) | $D_3$ (107) | TRUE |
|---|---|---|---|---|
| $\Delta_1$ |  | + | − | $D_2 \cdot \bar{D}_3$ |
| $\Delta_2$ | − |  | + | $\bar{D}_1 \cdot D_3$ |
| $\Delta_3$ | + | − |  | $D_1 \cdot \bar{D}_2$ |

PHASE-PLANE DIAGRAM & TRUTH TABLE FOR THREE-PHASE DETECTOR

INVENTOR
NORMAN P. GLUTH,
BY Robert H. Himes
ATTORNEY

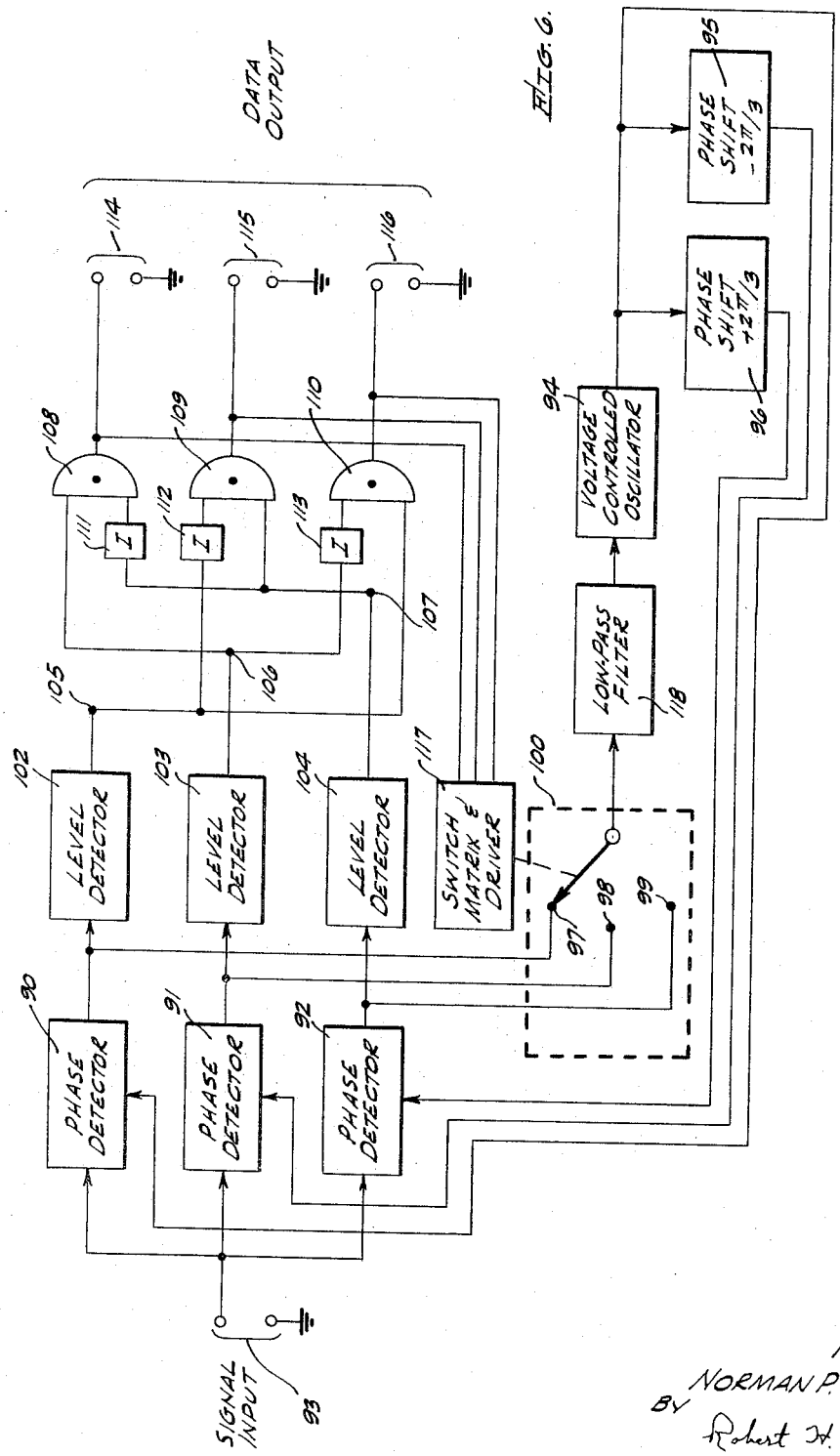

United States Patent Office 3,336,534
Patented Aug. 15, 1967

3,336,534
MULTI-PHASE DETECTOR AND KEYED-ERROR DETECTOR PHASE-LOCKED-LOOP
Norman P. Gluth, Orange, Calif., assignor to Hughes Aircraft Company, Culver City, Calif., a corporation of Delaware
Filed Feb. 8, 1965, Ser. No. 430,997
4 Claims. (Cl. 331—12)

ABSTRACT OF THE DISCLOSURE

A keyed-error detector phase-locked-loop apparatus for use in a signaling system having three or more phases wherein a set of phase detectors function in a manner to divide the allowable phase positions of the input signal into substantially equal portions thereby allowing successive phases of the input signal to be converted into useable data. In operation, the set of detectors provides data output and initiates switching to a "reference" detector which generates an error signal. Error signals from successive reference detectors are, in turn, used to control the phase of a voltage controlled oscillator which provides the basic signal used as a reference for all of the detectors.

This invention relates to an apparatus for extracting a local phase coherent reference from a received signal having phase encoded data and, more particularly, to apparatus for providing a useful error signal for the phase-locked-loop whenever the input phase encoded data signal spectrum is symmetrical and for providing zero error signal as an input during those times when the encoded data causes the signal spectrum to be unsymmetrical.

One contemporary form of phase reference recovery system employs apparatus for multiplying the incoming signal by N, where N is the number of symmetrically disposed signal phase positions, together with a narrow band-pass filter to reject noise and unwanted signal components and a conventional phase-locked-loop with oscillator running at N times the input carrier frequency. This locked oscillator signal is divided by N and used in the data detection process. A system designed in this manner has the disadvantage that phase shifts in the multiplier and bandpass filter affect the signal prior to phase locking of the oscillator but do not affect the data signal path. These phase shifts must be compensated and are outside the phase-locked-loop. If these phase shifts should change due to temperature, age, power supply voltage change, etc., the reference phases used for data detection will be in error by an unknown amount.

It is therefore an object of the present invention to provide an improved keyed-error detector phase-locked-loop wherein data and error signals pass through the same filters thereby eliminating unknown phase shifts outside the correction loop.

Another object of the present invention is to provide a keyed-error detector phase-locked-loop which does not require signal multiplication with its attendant degradation of signal-to-noise ratio.

Still another object of the present invention is to provide a keyed-error detector phase-locked-loop wherein the output of the error channel is zero except for small phase errors whereby the loop does not attempt to follow the data or wander during times when rapid input signal phase changes are occurring.

In accordance with the present invention, a keyed-error detector phase-locked-loop apparatus is provided for use in conjunction with a signalling system having a predetermined number of phases. In general, a first set of phase detectors is required to determine data. In instances where the signalling system uses an odd number of phases, the first set necessarily includes a number of phase detectors equal to the number of phases. Alternatively, where the signalling system uses an even number of phases, the first set need only include a number of phase detectors equal to one-half the number of phases. In either case, the respective phase planes of the first set of detectors are used to divide the allowable phase positions of the input signal into substantially equal portions.

In addition, where there is an odd number of phases, the respective phase planes of the detectors always bisect a diametrically opposite portion thereby providing references aligned with the respective signal phase positions. Where there is an even number of phases, however, a second set of phase detectors equal in number to the number of phases to provide the references for the signal phase positions is required. In operation, the first set of detectors provides data output and initiates switching to a detector having an appropriate phase plane for a reference. The output from the reference detector is, in turn, used to control the phase of a voltage controlled oscillator. In instances where a second set of detectors are employed to provide the reference phase planes, it is possible to employ a single detector responsive to selected reference inputs.

The above-mentioned and other features and objects of this invention and the manner of attaining them will become more apparent by reference to the following description taken in conjunction with the accompanying drawings, wherein:

FIG. 1 illustrates a schematic block diagram of a two-phase detector and keyed-error detector phase-locked-loop apparatus of the present invention;

FIG. 2 shows voltage diagrams of the input and output signals in the apparatus of FIG. 1;

FIG. 3 shows phase diagrams for the detectors in the apparatus of FIG. 1;

FIG. 4 illustrates a schematic block diagram of four-phase detector and keyed-error detector phase-locked-loop apparatus in accordance with the present invention;

FIG. 5 shows a phase plane diagram and truth table for the apparatus of FIG. 4;

FIG. 6 shows a schematic block diagram of three-phase detector and keyed-error detector phase-locked-loop apparatus in accordance with the invention; and FIG. 7 illustrates a phase plane diagram and truth table for the apparatus of FIG. 6.

Referring now to FIG. 1 of the drawings, there is shown a schematic block diagram of a two-phase detector and keyed-error detector phase-locked-loop in accordance with the present invention. In particular, the apparatus includes phase detectors 10, 11 and 12, with inputs responsive to a common signal input available at input terminals 14. Phase detector 10 has an input connected directly to the output of a voltage controlled oscillator 15 while phase detector 11, on the other hand, is connected to the output of voltage controlled oscillator 15 through a 90° phase shifter 16, and phase detector 12 is connected to the output of voltage controlled oscillator 15 through a −90° phase shifter 17. As a consequence, phase detector 10 is referenced directly to the output signal from voltage controlled oscillator 15, i.e., 0° reference; phase detector 11 receives a 90° reference; and phase detector 12 receives a 270° reference.

The output of phase detector 10 is applied to a level detector 20, the output of which is, in turn, applied to data output terminals 21. The level detector 20 provides a bilevel voltage output based on whether or not the input voltage thereto is greater than or less than a predetermined threshold voltage which may be zero volts relative to ground. A double-pole, single-throw switch 22 is controlled by a switch driver 23 over a mechanical linkage 24 and includes input terminals 25, 26 connected to the output of phase detectors 11, 12, respectively, and an arm 27 connecting either of the input terminals 25, 26 to an output terminal 28. The position of the arm 27 of switch 22 is caused to contact either input terminal 25 or 26 by means of the switch driver 23 which operates in response to the bilevel output voltage available from level detector 20. It is, of course, within the present state of the art to employ a completely electronic switching mechanism in lieu of the switch 22 should the need arise. The output terminal 28 of switch 22 is connected through a lowpass filter 30 to the control input terminal of voltage controlled oscillator 15 whereby the output signals from phase detectors 11 or 12 control the frequency and phase of the reference signal. The cutoff frequency of the lowpass filter 30 is not critical, but preferably should be less than one-tenth the number of elements per second being employed in the communicating signal.

Referring to FIG. 2, waveform 32 illustrates four successive elements of a signal typically applied across signal input terminals 14. Each element of waveform 32 comprises a signal that is either exactly in-phase or 180° out-of-phase with the reference signal appearing at the output of voltage controlled oscillator 15. In general, if the input signal and reference signals are exactly in-phase, the output of phase detector 10 will be more positive than the predetermined threshold level of level detector 20, and when the input signal is 180° out-of-phase from the reference signal, the output will be more negative than the predetermined threshold level of level detector 20. Thus, as shown in the drawings, the waveform 32 illustrates in proceeding from left to right a first element in-phase with the reference signal; second and third elements 180° out-of-phase with the reference signal; and a fourth element again in-phase with the reference signal. The output of level detector 20 will be at a first level 33 during the first and fourth elements and at a second level 34 different from the level 33 during the second and third elements. The resulting waveform 35, made up of the two levels 33, 34, constitutes the data output signal corresponding to the input signal waveform 32 available at the data output terminals 21. In addition to being the data output signal, the waveform 35 is used to energize the switch driver 23 to position the arm 27 of switch 22 in a manner hereinafter explained in connection with FIG. 3.

Referring to FIG. 3a, a voltage vector 36 illustrates the relative phase of the input signal during the first and fourth elements of the waveform 32, FIG. 2, and the vector 37 illustrates the relative phase of the input signal during the second and third elements of waveform 32 during which time the signal input voltage is 180° out-of-phase with the reference voltage at the output of voltage controlled oscillator 15. The detector 10 has a phase plane 38 which is normal to the vectors 36, 37 and is poled in a manner such that a positive voltage is generated in response to an in-phase input and a negative voltage is generated in response to an out-of-phase input.

Referring to FIG. 3b, the phase plane 40 of detector 11 passes through the 0° reference point established by the phase of the signal input applied to signal input terminals 14. Because of the 90° reference to voltage controlled oscillator 15, the right side of phase plane 40, as viewed in the drawing, corresponds to a positive output from detector 11 and the left side to a negative output. It is apparent that when the in-phase vector 36 is exactly in-phase with the phase plane of detector 11, zero output results. Assume now that the phase of voltage controlled oscillator 15 begins to lead thereby producing an error $\theta_1$, between the in-phase signal 36 and the phase plane 40 of detector 11. The in-phase vector 36 appears on the right side of the plane 40, as viewed in the drawing, thereby causing a positive voltage to be generated at the output of detector 11. In instances where an increase in the voltage applied to the voltage controlled oscillator 15 causes it to decrease in frequency, i.e., causes the phase to retard, the output of detector 11 is connected through the switch 22 and the lowpass filter 30 to the voltage controlled oscillator 15 by the switch driver 23 in response to the voltage level 33 of waveform 35, FIG. 2.

In other cases, the voltage level 34 causes the switch driver 23 to position the switch 22 in a manner to connect the output of phase detector 12 through the lowpass filter 30 to the voltage controlled oscillator 15. This situation is illustrated in FIG. 3c. Referring to FIG. 3c, the phase plane 42 of detector 12 is identical to the phase plane 40 of detector 11 with the exception that the polarities of the output signals generated are reversed. Under normal circumstances, the out-of-phase vector 37 will coincide with the lower portion of phase plane 42 when the output of phase detector 12 is connected through the switch 22 and the low-pass filter 30 to the voltage controlled oscillator 15. If the phase of the reference signal generated by voltage controlled oscillator 15 begins to lead, an error, $\theta_2$, will develop between out-of-phase vector 37 and phase plane 42, again causing a positive signal to be developed at the output of phase detector 12. This positive signal, as before, causes the phase of voltage controlled oscillator 15 to retard thereby decreasing the error, $\theta_2$, to 0.

Referring now to FIG. 4 of the drawings, there is illustrated a four-phase detector and keyed-error detector phase-locked-loop apparatus in accordance with the present invention. In particular, the apparatus comprises phase detectors 50, 51 having phase planes A and B, respectively, and phase detectors 52, 53, 54 and 55 having phase planes $\varphi_1$, $\varphi_2$, and $\varphi_4$, respectively. The phase detectors 50–55 receive a signal input by means of respective connections to input terminals 56. The reference inputs to the phase detectors 50–55 are determined by the frequency and phase characteristics of an output signal generated by a voltage controlled oscillator 58. As in the case of voltage controlled oscillator 15, FIG. 1, voltage controlled oscillator 58 retards in-phase in response to a positive increase in the control signal applied thereto through a low pass filter 60 and advances in-phase in response to a negative signal. The phase of the output signal generated by voltage controlled oscillator 58 is selected as a reference phase in the phase plane diagram shown in FIG. 5. Reference in this diagram is the 12 o'clock position, as viewed in the drawing. The output from voltage controlled oscillator 58 is applied through a 45° phase shifter 62 to the reference input of phase detector 50 and through a −45° phase shifter 63 to the reference input of phase detector 51. Thus, the phase planes A and B corresponding to phase detectors 50, 51, respectively, divide the phase plane diagram of FIG. 5 into equal quadrants that are bisected by the angles 90°, 180°, 270° and 360° measured clockwise from the reference angle. Further, the reference input of phase detector 52 is connected directly to the output of voltage controlled oscillator 58 thereby establishing the phase plane $\varphi_1$ which is 90° from the reference; the reference input of phase detector 53 is connected through a 90° phase shifter 64 to the output voltage controlled oscillator 58 thereby establishing phase plane $\varphi_2$ which is 180° relative to the reference; the reference input of phase detector 54 is connected through a 180° phase shifter 65 to the output of voltage controlled oscillator 58 thereby establishing phase plane $\varphi_3$ which is 270° from the reference; and phase shifter 55 is connected through a −90° phase shifter 66 to the output of voltage controlled oscillator 58 thereby establishing phase plane $\varphi_4$ at 360° or 0° relative to the reference.

The outputs from phase detectors 50, 51 are connected through level detectors 68, 70, respectively, to junctions 71, 72. The level detectors 68, 70 operate in the same manner as the level detector 20, FIG. 1; i.e., if a voltage above a certain threshold is applied to the input, a predetermined fixed voltage is generated at the output, and if a voltage below the threshold is applied to the input, a zero of fixed negative voltage is developed at the output. Because of the bilevel characteristics of the output signals developed by level detectors 68, 70, it is possible to employ digital computer type circuitry to determine the identity of the data being received. The manner in which this data is identified is illustrated in the truth table of FIG. 5. In particular, if the quadrants are identified by the phase planes $\varphi_1$, $\varphi_2$, $\varphi_3$, and $\varphi_4$ of the detectors 52–55, respectively, a signal in quadrant $\varphi_1$ generates a positive signal at the output of phase detector 50 and a negative signal at the output of phase detector 51. Thus, designating the outputs of detectors 50, 51 in terms of phase planes A and B thereof with positive signals as the principal and negative signals as the complement, the Boolean product of A multiplied by the complement of B, i.e., $\overline{B}$, generates a true signal. True signals for the remaining quadrants $\varphi_2$, $\varphi_3$ and $\varphi_4$ are illustrated in the truth table, FIG. 5. This truth table is instrumented by way of example by "and" gates 74, 75, 76, 77 having outputs connected to date output terminals 78, 79, 80, 81, respectively. Junction 71 is connected directly to inputs of "and" gates 74, 77 and through inverters 82, 83, respectively, to "and" gates 75, 76. Junction 72, on the other hand, is connected directly to inputs of "and" gates 76, 77 and through inverters 84, 85, respectively, to "and" gates 74, 75. Thus, a positive polarity signal appearing at the data output terminals 78, 79, 80 or 81 indicates that the phase of the received signal is in the corresponding quadrant $\varphi_1$, $\varphi_2$, $\varphi_3$ or $\varphi_4$, respectively. Outputs from the "and" gates 74, 77 are also connected to the inputs of a switching matrix and driver apparatus 86 which positions a switch 87 in a manner to connect the output of the phase detector corresponding to the quadrant in which the signal is received to the input of lowpass filter 60 thereby to control the phase of the voltage controlled oscillator 58 during the element through which the signal will be received. The manner in which this control is achieved is the same as explained in connection with FIG. 3. It is, of course, evident that switching can be accomplished intermediate the output of the phase shifters 64, 65, 66 and the output of voltage controlled oscillator 58, and a single phase detector, should this arrangement be desired.

Referring now to FIG. 6 of the drawing, there is shown a three-phase detector and keyed-error detector phase-locked-loop as an example of apparatus in accordance with the present invention having an odd number of phases. In particular, the apparatus of FIG. 6 comprises phase detectors 90, 91 and 92, each responsive to signal inputs which appear at signal input terminals 93. Phase detector 90 receives a reference input directly from a voltage controlled oscillator 94 that is controlled in a manner similar to the voltage controlled oscillators 15, 58, FIGS. 1 and 4, respectively; namely, an increase in potential produces a phase lag and a decrease in potential produces a phase advance. Phase detector 91 also receives a reference input from voltage controlled oscillator 54 but through a −120° phase shifter 95 and, similarly, phase detector 92 receives a reference input from the voltage controlled oscillator 94 but through a +120° phase shifter 96. With the phase of the voltage controlled oscillator 94 taken as a reference, 0° reference being at the 12 o'clock position, the phase planes of detectors 90, 91, 92, designated $D_1$, $D_2$ and $D_3$, respectively, are as shown in the phase plane diagram of FIG. 7.

The output from the phase detectors 90, 91, 92 are connected to input contacts 97, 98 and 99 of a switch 100 and, in addition, are connected through level detectors 102, 103 and 104, respectively, to junctions 105, 106 and 107. As before, level detectors 102, 103, 104 produce bilevel outputs dependent upon whether or not the input voltage is above or below a predetermined threshold level. The bilevel voltage outputs developed by level detectors 102, 103, 104 in response to the phase of data received at signal input terminals 93 makes it possible to determine the particular 120° sector in which the data appears by the use of digital computer type gating apparatus. Referring to FIG. 7, the 120° sectors are designated as $\Delta_1$, $\Delta_2$ and $\Delta_3$ to correspond to the sectors bisected by the phase planes $D_1$, $D_2$ and $D_3$, respectively. In the case of data in sector $\Delta_1$, a positive polarity signal is developed at junction 106, a negative polarity signal is developed at junction 107, and the polarity of the signal appearing at junction 105 is indeterminate. Thus, with the outputs at the junctions 105, 106, 107, designated as $D_1$, $D_2$, $D_2$, respectively, $(D_2 \cdot \overline{D}_3)$ will be true for data appearing in section $\Delta_1$. Similarly $(\overline{D}_1 \cdot D_3)$ will be true for data appearing in section $\Delta_2$, and $(D_1 \cdot \overline{D}_2)$ will be true for data appearing in sector $\Delta_3$. The truth table of FIG. 7 is instrumented, by way of example, by connecting junctions 105, 106, 107 directly to an input to "and" gates 110, 108, 109, respectively. In addition, junction 105 is connected through an inverter 112 to an input of "and" gate 109; junction 106 is connected through an inverter 113 to an input of "and" gate 110; and junction 107 is connected through an inverter 111 to an input of "and" gate 108. The outputs of "and" gates 108, 109, 110 are connected to data output terminals 114, 115 and 116, respectively, and, in addition, are connected to the inputs of a switch matrix and driver apparatus 117. Switch matrix and driver apparatus 117 controls the position of the switch 100 which connects a corresponding output of one of the phase detectors 90, 91 or 92 to the input of a lowpass filter 118, the output of which is connected to the voltage controlled oscillator 94 in a manner to control the frequency and phase thereof. The phase detector 90, 91 or 92 thus connected is the phase detector 90, 91, 92 which provides the phase plane $D_1$, $D_2$, $D_3$ that bisects the sector wherein the received data appears.

In operation, the three-phase detector and keyed-error detector phase-locked-loop apparatus of FIG. 6 is similar to the devices of FIGS. 1 and 4 with the exception that phase detector 90, 91, 92 may now perform a dual purpose; namely, the respective phase planes thereof can both divide the phase diagram into equal sectors and, in addition, provide a phase plane which bisects each sector. This is typical of all apparatus in accordance with the present invention wherein there is an odd number of phases employed.

Although the invention has been shown in connection with a certain specific embodiment, it will be readily apparent to those skilled in the art that various changes in form and arrangement of parts may be made to suit requirements without departing from the spirit and scope of the invention. For example, it is evident that the disclosed system may be readily expanded to 5, 6, 7, 8 or any arbitrary number of phases, as desired.

What is claimed is:

1. An apparatus for receiving $n$-phase data of predetermined frequency, $n$ being an odd integer no less than three, said apparatus comprising means including a voltage controlled oscillator for providing a reference signal of a frequency equal to said predetermined frequency; means including $n$ phase detectors each responsive to said $n$-phase data of predetermined frequency and said reference signal for producing a phase plane between each of said $n$ phases of said data thereby defining $n$ sectors and producing an error signal to each phase of said $n$-phase data of predetermined frequency; means including a level detector responsive to each of said phase detectors for producing bilevel signals corresponding to each phase detector representative of the side of each respective phase plane of the phase of said data; means responsive to said bilevel signals for generating sucessive signals indicative of the sector including the phase of said data; and switching means responsive to said bilevel signals and connected to said error signals for connecting the error signal corresponding to the phase of the data being received to said voltage controlled oscillator.

2. An apparatus for receiving $n$-phase data of predetermined frequency, $n$ being an even integer no less than four, said apparatus comprising means including a voltage controlled oscillator for providing a reference signal of a frequency equal to said predetermined frequency; means including $n/2$ phase detectors each responsive to said $n$-phase data of predetermined frequency and said reference signal for producing a phase plane between each of said $n$ phases of said data thereby defining $n$ sectors; means including a level detector responsive to each of said $n/2$ phase detectors for producing $n/2$ bilevel signals corresponding to each phase detector representative of the side of each respective phase plane of the phase of said data; means responsive to said bilevel signals for generating successive signals indicative of the sector including the phase of said data; means including $n$ additional phase detectors and a plurality of phase shifters responsive to said data and to said reference signal for producing an error signal corresponding to each phase of said $n$-phase data of predetermined frequency; and switching means responsive to said bilevel signals for connecting the error signal corresponding to the phase of the data being received to said voltage controlled oscillator.

3. An apparatus for receiving four-phase data of predetermined frequency, said apparatus comprising means including a voltage controlled oscillator for providing a reference signal of a frequency equal to said predetermined frequency; means including first and second phase detectors responsive to said four-phase data of predetermined frequency and said reference signal for producing a phase plane between each of said four phases of said data thereby defining four sectors; first and second level detectors responsive to said first and second phase detectors, respectively, for producing first and second bilevel signals representative of the side of each respective phase plane at which the phase of said data is located; means responsive to said first and second bilevel signals for generating four signals indicative of the sector of said four sectors including the phase of said data; means including no less than four additional phase detectors and a plurality of phase shifters responsive to said reference signal for providing first, second, third and fourth error signals corresponding to said four sectors; and means responsive to said four signals indicative of the sector of four sectors including the phase of said data for connecting said corresponding error signal to said voltage controlled oscillator.

4. An apparatus for receiving three-phase data of predetermined frequency, said apparatus comprising means including a voltage controlled oscillator for providing a reference signal of a frequency equal to said predetermined frequency; means including first, second and third phase detectors responsive to said three-phase data of predetermined frequency and said reference signal for producing a phase plane between each of said three phases of said data thereby defining three sectors, each one of said phase planes additionally coinciding with a discrete one of said phases of said data thereby providing error signals corresponding to said sectors; first, second and third level detectors responsive to said first, second and third phase detectors, respectively, for producing first, second and third bilevel signals representative of the side of each respective phase plane at which the phase of said data is located; means responsive to said first, second and third bilevel signals for generating three data output signals indicative of the particular sector of said three sectors including the phase of said data; and means responsive to said three data output signals for connecting said corresponding error signal to said voltage controlled oscillator.

References Cited

UNITED STATES PATENTS 3,181,122   4/1965   Brown _____ 328—155 X
3,238,459   3/1966   Landee _____ 340—170 X ROY LAKE, *Primary Examiner.*

J. B. MULLINS, *Examiner.*